Patented Sept. 13, 1927.

1,642,180

UNITED STATES PATENT OFFICE.

WINFIELD SCOTT, OF WILMINGTON, DELAWARE, ASSIGNOR TO E. I. DU PONT DE NEMOURS & COMPANY, OF WILMINGTON, DELAWARE, A CORPORATION OF DELAWARE.

DI-PARA-XYLYLGUANIDINE.

No Drawing.   Application filed November 27, 1922.   Serial No. 603,671.

This invention relates to a new substance, di-para-xylylguanidine, and to a process of making the same.

The di-p-xylylguanidine has most probably the following graphical formula:

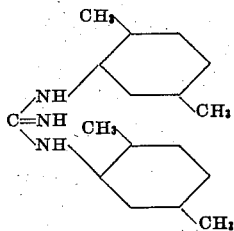

To produce the new substance, either ammonia or ammonium hydroxide may be caused to react with di-p-xylylthiourea in the presence of a basic lead compound such as litharge. The di-p-xylylthiourea may be prepared for example by reaction between carbon bisulphide and para-xylidine.

The production of di-p-xylylguanidine may be illustrated by the following example:

Twenty-five (25) parts (by weight) of di-p-xylylthiourea (powdered) is added to one hundred and twelve (112) parts by weight of alcohol (95% alcohol containing 0.5% benzol) at a temperature between about 40 and 50° C. in a closed vessel. To the resulting mixture there is added slowly, with stirring, the thin paste formed from forty parts of litharge and 54 parts of ordinary concentrated (28%) ammonium hydroxide solution. After the addition of the paste is completed the reaction mass is kept at a temperature of about 50° C. for about two hours with continuous stirring.

At the end of the two-hour heating period a sample is drawn off and filtered and the filtrate warmed with some fresh litharge. If darkening occurs, an additional amount, say 10-20% of litharge is added to the original mixture and stirring continued for half an hour longer, whereupon the contents of the vessel are heated to boiling and filtered hot by suction. The lead sludge is then extracted with the mother liquor obtained after crystallizing the first filtrate. A second extraction yields only a very small amount of the dixylyl-guanidine. After crystallization, the alcohol is distilled off from the mother liquor, the residue extracted with dilute hydrochloric acid, preferably at room temperature, and any tarry material insoluble in the dilute acid is removed. The solution of di-p-xylylguanidine hydrochloride is then neutralized with caustic until alkaline with Clayton yellow to precipitate the base, which is then filtered and washed free from sodium chloride. The total yield is 80-82% of theoretical.

Since this imidation reaction is exothermic and will proceed at room temperature it is not necessary nor desirable to attain temperatures of 60-70° C. A maximum temperature of 50° C. is all that is necessary and side reactions are greatly reduced. Avoiding a temperature above 50° C. is also desirable in the manufacture of diphenyl- and ditolyl-guanidine from the corresponding thioureas.

The new base, di-para-xylylguanidine, has a melting point range of from 170 to 170.5° C. The new compound is quite similar to diphenylguanidine and di-o-tolylguanidine in its physical and some of its chemical properties. It crystallizes from alcohol or toluene in needles. The hydrochloride of di-p-xylylguanidine is quite soluble in cold water and affords a convenient method of separating it from resinous products which may be produced during the amidation.

The chief utility, at present, of di-p-xylylguanidine is in connection with the vulcanization of rubber for which it is an excellent accelerator.

I claim:

Di-para-xylylguanidine.

In testimony whereof I affix my signature.

WINFIELD SCOTT.